May 10, 1927. 1,628,559
E. S. SHOWERS
COASTER WAGON BRAKE
Filed April 29, 1926   2 Sheets-Sheet 1
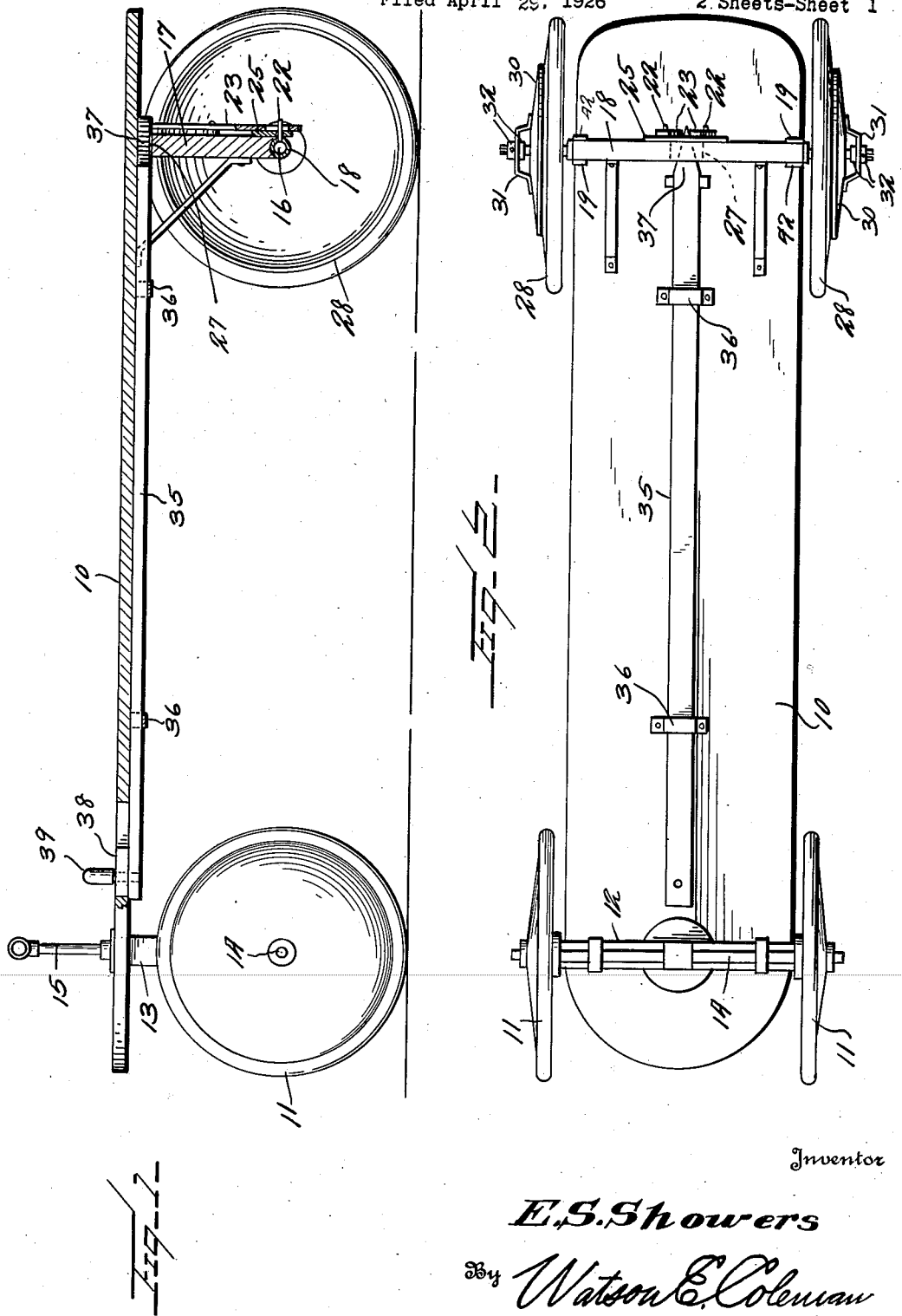
Inventor
E. S. Showers
By Watson E. Coleman
Attorney May 10, 1927.
E. S. SHOWERS
COASTER WAGON BRAKE
Filed April 29, 1926    2 Sheets-Sheet 2
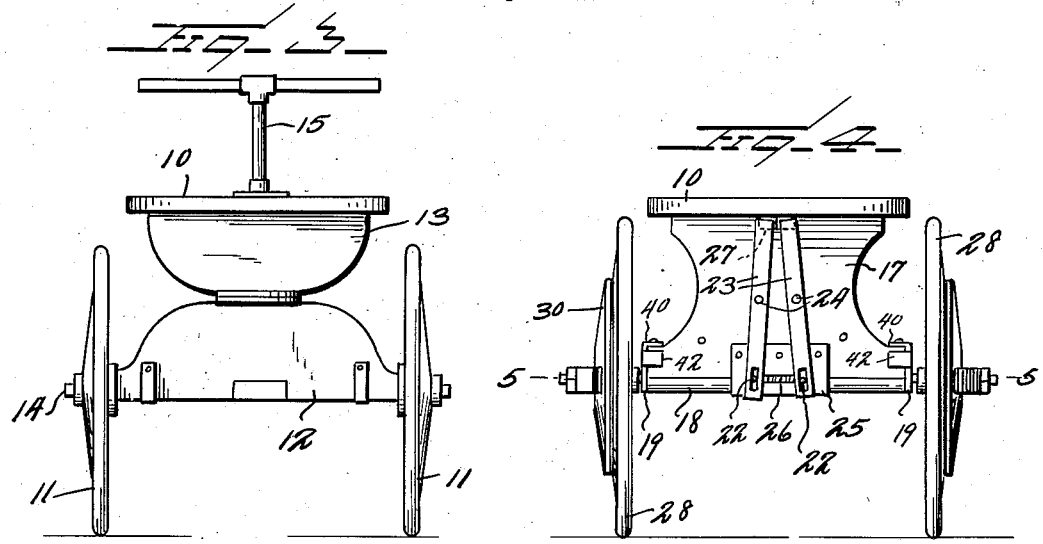
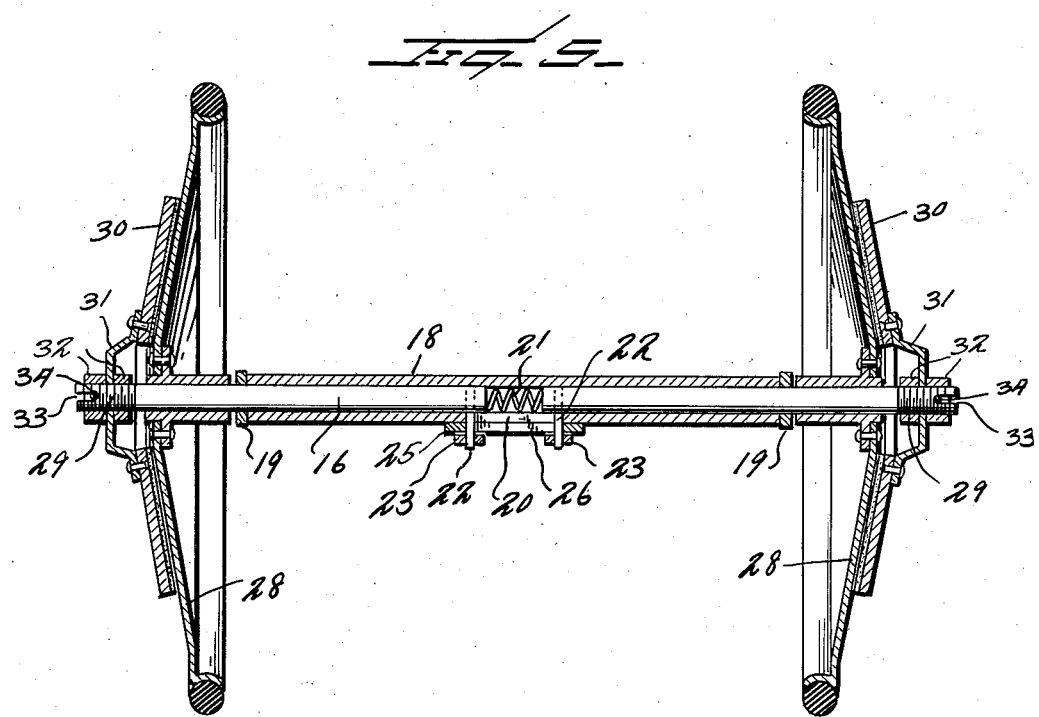
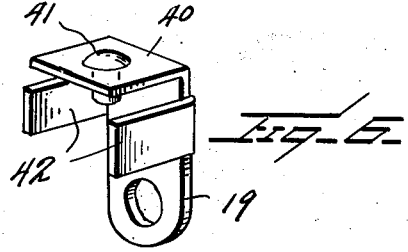
Inventor
E. S. Showers
By Watson E. Coleman
Attorney Patented May 10, 1927.

1,628,559

UNITED STATES PATENT OFFICE.

ERNEST SINCLAIR SHOWERS, OF CHAMPION, MICHIGAN.

COASTER-WAGON BRAKE.

Application filed April 29, 1926. Serial No. 105,569.

This invention relates to brakes for coaster wagons and the general object of the invention is to provide a very effective brake of this character which includes braking members disposed exteriorly to but adapted to fit closely against the outer faces of the two rear disk wheels.

A further object is to provide means adapted to be operated from the front end of the wagon platform whereby these coaster brakes may be set or released.

A still further object is to provide a construction of this character wherein the braking disks are normally urged away from the wheels but urged toward the wheels and against the same by the longitudinal movement of a brake operating member mounted beneath the platform of the wagon.

Other objects will appear in the course of the following description.

My invention is illustrated in the accompanying drawings wherein:—

Figure 1 is a longitudinal sectional view of a coaster wagon constructed in accordance with my invention;

Fig. 2 is a bottom plan view of the wagon shown in Figure 1;

Fig. 3 is a front elevation of the wagon;

Fig. 4 is a rear elevation thereof;
Fig. 5 is a cross sectional view through the rear axle and wheels;

Fig. 6 is a perspective view of the clip 19.

Referring to these drawings 10 designates the platform of a wagon which is elongated, the forward end of this platform being mounted upon wheels 11 for steering movement as illustrated in my co-pending application filed April 29, 1926, Serial No. 105,568. I have illustrated the forward wheels of the wagon as supporting a bolster member 12 which in turn supports a second bolster member 13 upon which the platform 10 rests, these bolster members being mounted for turning movement upon each other.
The front wheels are mounted upon a front axle 14 and this front axle is turned with the lower bolster member 12 by means of a steering column 15 having a handle. It will be understood that I have merely illustrated the general features of the steering mechanism above referred to and that as far as this present application is concerned, I do not wish to be limited to any particular steering mechanism.
Disposed between the platform 10 and the rear axle 16 and supporting this rear axle, is a bolster 17, the lower edge of which is grooved or channeled for the reception of a length of tubing 18, through which the rear axle passes, this tubing being held in engagement with the rear bolster by means of clips 19. This tubular member 18 is longitudinally slotted as at 20 at its middle. The axle 16 is formed in two sections disposed within the tube 18 and projecting laterally therefrom and these two sections of the axle are urged away from each other by means of a coiled contractile spring 21 disposed within the tube 18. Each of the axle sections at its inner end carries a radially projecting pin 22 which extends through the slot 20.

Pivotally mounted upon the rear bolster 17 are the levers 23, each pivoted at its middle as at 24, the lower end of each lever being vertically slotted for the reception of one of the pins 22. A plate 25 is mounted against the face of the rear bolster 17 and this plate is longitudinally slotted as at 26 and the pins 22 pass through these slots and then through the slot 20 previously described. This plate 25 is bolted or otherwise attached to the rear bolster. The upper edge of the rear bolster is cut out as at 27.

The wheels 28 are shown as disk wheels of sheet metal and the axles 16 extend loosely through the hubs of these wheels. Each axle section at its ends is screw-threaded as at 29. Mounted upon each axle section is a metallic disk 30 which is dished so as to conform to the dish-shape of the disk wheel 28, and this disk 30 is annular in form so as to accommodate the hub of the wheel 28. A metal strip or yoke 31 is riveted or otherwise attached to the disk 30 and arches over the central opening thereof and this strip 31 is apertured for the passage of the shaft or axle section 16. Nuts 32 engage the screw-threaded portion 29 on each side of the strip 31. Preferably the extremities of the axle sections will not only be screw-threaded but will be longitudinally slotted as at 33 and cotter pins 34 will pass through the nuts 32 and through the longitudinally extending kerfs or slots 33 so as to permit the nuts to be adjusted and thus adjust the yoke 31 while, when the cotter pins are in place, they hold the nuts from accidental movement.

The brake operating device comprises a longitudinally extending bar 35 mounted in U-shaped guides 36 attached to the bottom of the platform 10. This brake operating rod or bar 35 at its rear end extends through the cut away portion 27 of the rear bolster 17 and between the upper ends of the levers 23. The upper ends of these levers are urged towards each other by the spring 21. The rod 35 is normally retracted but when it is pushed rearward, the wedge-shaped or beveled end 37 will force the upper ends of the levers 23 apart, thus causing the lower ends of the levers to move towards each other and thus drawing on the axle sections and the brake disks and drawing these brake disks against the wheels. The platform 10 is longitudinally slotted and operating in this slot is a guide 38 which is attached to the operating rod 35 and extending upward from this sliding block 38 is a handle 39 whereby the operating rod may be shifted. It will be seen now that when the operating rod is shifted rearward the brakes will be applied but when it is shifted forward the spring 21 will cause the brake disks to move away from the faces of the disk wheels and thus the brakes will be released. Preferably the disks 30 will be lined on their inner faces with some sort of brake lining having good frictional engagement with the metallic disk wheel when the brakes are applied. Preferably, also the yoke 31 will be screw-threaded upon the axle section 16 so that the yoke and the brake annulus 30 will not rotate with the wheel when the brakes are applied.

While I do not wish to be limited to its use, I preferably form the clip 19 so that it is provided with a flange 40 resting upon the top of the lower corner of the rear bolster through which flange passes a headed pin 41 or rivet which engages in the recess in the top of the lower corner of the bolster. This clip 19 is provided with the members 42 embracing the bolster.

While I have illustrated certain details of construction and arrangement of parts which I have found to be particularly effective in actual practice, I do not wish to be limited thereto as it is obvious that many changes might be made therein without departing from the spirit of the invention as defined in the appended claims.

I claim:—

1. In a coaster wagon a hollow axle, disk wheels mounted thereon, and braking means comprising annular brake disks disposed concentric to the axle and exterior to the wheels, means urging said disks away from the wheels, and manually controllable means for simultaneously applying said brake disks, said means including elements passing longitudinally through the hollow axle and connected to the brake disks.

2. The combination with an axle and a disk wheel mounted loosely thereon, of braking members mounted upon the axle and adapted to bear against the side faces of the disk wheels, means tending to urge said braking members away from the disk wheels, manually controllable means for drawing the braking members against said disk wheels, and means for adjusting the braking members toward or away from the wheels.

3. In a wagon of the character described a rear axle formed in two sections, means supporting the rear axle and permitting longitudinal movement of the two sections thereof, disk wheels loosely mounted upon the rear axle sections, braking members carried by said rear axle sections, a spring disposed between the sections and urging the sections apart and the braking disks away from their respective wheels, and manually controllable means for shifting the two sections toward each other to thereby apply the brakes.

4. In a wagon of the character described a rear axle formed in two sections, means supporting the rear axle and permitting longitudinal movement of the two sections thereof, disk wheels loosely mounted upon the rear axle sections, braking members carried by said rear axle sections, a spring disposed between the sections and urging the sections apart and the braking disks away from their respective wheels, and manually controllable means for shifting the two sections toward each other to thereby apply the brakes including levers operatively mounted upon the wagon and engaging the two sections of the axle, and a wedge-shaped member manually shiftable to engage the opposite ends of said levers to thereby urge those ends of the levers connected to the axle sections towards each other.

5. In a wagon, a platform, a rear bolster, a rear axle mounted upon the bolster, rear wheels mounted upon the axle, said wheels being disk-like, brake disks mounted upon the axle and confronting said disk wheels, means tending to urge said disks away from the disk wheels, and means for shifting the brake disks toward the disk wheels including a longitudinally movable rod mounted upon the platform and operatively engaging said brake disks.

6. In a wagon, a platform, a rear bolster, a rear axle mounted thereon and consisting of two relatively movable sections, levers pivoted upon the bolster and at their lower ends respectively engaging said sections, rear disk wheels loosely mounted upon the axle sections, brake disks mounted upon the axle sections and confronting the respective disk wheels, resilient means urging said axle sections apart and the brake disks away from the wheels, and means for causing the movement of the brake disks toward the wheels including a longitudinally extending rod slidingly mounted upon the platform and having a wedge-shaped end adapted to engage between said levers to thereby force the upper ends of the levers apart and the lower ends of the levers towards each other to apply the brakes.

7. In a coaster wagon, a platform, a rear bolster, a tubular member mounted upon the rear bolster and having a slot, opposed axle sections disposed within the tubular member and having pins extending out through said slot, a coiled compression spring disposed between the adjacent ends of said axle sections and urging said axle sections apart, a pair of vertical levers mounted upon the bolster and having their lower ends operatively engaging said pins, an actuating rod slidingly mounted upon the platform and having a wedge-shaped end disposed between said levers, the rod being slidable rearward to cause the upper ends of the levers to spread apart and the axle sections to be forced towards each other, rear disk wheels loosely mounted upon the axle sections, annular brake disks mounted upon the outer ends of the axle sections and confronting the disk wheels, and means for supporting the brake disks upon the axle sections and adjusting the brake disks toward or from the wheels.

8. In a coaster wagon, a platform, a rear bolster, a tubular member mounted upon the rear bolster and having a slot, opposed axle sections disposed within the tubular member and having pins extending out through said slot, a coiled compression spring disposed between the adjacent ends of said axle sections and urging said axle sections apart, a pair of vertical levers mounted upon the bolster and having their lower ends operatively engaging said pins, an actuating rod slidingly mounted upon the platform and having a wedge-shaped end disposed between said levers, the rod being slidable rearward to cause the upper ends of the levers to spread apart and the axle sections to be forced towards each other, rear disk wheels loosely mounted upon the axle sections, annular brake disks mounted upon the outer ends of the axle sections and confronting the disk wheels, and means for supporting the brake disks upon the axle sections and adjusting the brake disks toward or from the wheels, said means including a yoke attached to the corresponding brake disk and having screw-threaded engagement with the axle section, and opposed nuts having screw-threaded engagement with the axle section and disposed on each side of the yoke.

In testimony whereof I hereunto affix my signature.

ERNEST SINCLAIR SHOWERS.